Figure 1:
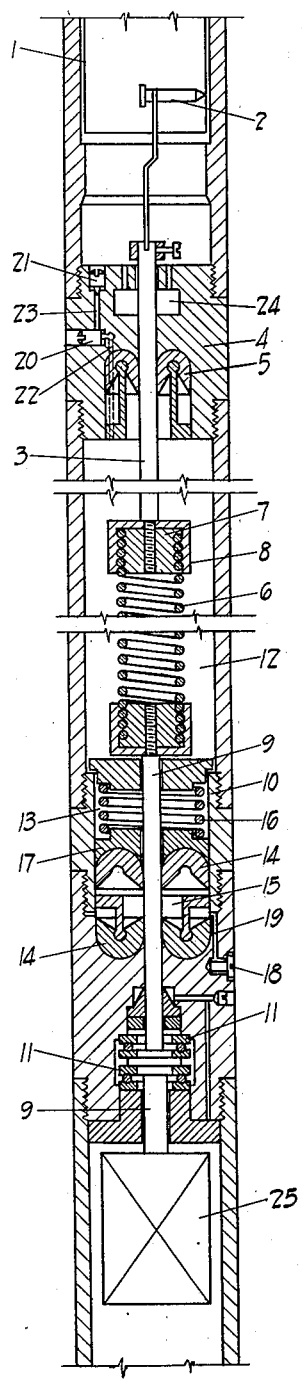

Sept. 3, 1940.    H. HÜGEL    2,213,802
BOREHOLE TEMPERATURE MEASURING DEVICE
Filed Dec. 27, 1938

Inventor: Helmut Hügel
By his Attorney:

Patented Sept. 3, 1940

2,213,802

UNITED STATES PATENT OFFICE 2,213,802

BOREHOLE TEMPERATURE MEASURING DEVICE

Helmut Hügel, Campina, Rumania, assignor to Shell Development Company, San Francisco, Calif., a corporation of Delaware Application December 27, 1938, Serial No. 247,749
In Germany February 10, 1938

3 Claims. (Cl. 73—269)

This invention pertains to temperature-measuring devices and relates more specifically to devices which are adapted to be lowered into a borehole, and in which use is made of the thermal expansion or contraction of a working fluid to register automatically the variations in the temperature of the borehole.

It has long been established that a knowledge of the temperatures prevailing in oil wells is essential for efficient oil-field exploitation, and a number of methods and devices for measuring and recording these temperatures have been devised.

These devices usually comprise a chart, movable or rotatable at a constant speed, and a thermally expansive fluid acting upon a member responsive thereto and carrying a marker in contact with said chart. When the device is lowered into a borehole the marker traces on the chart a graph of the temperatures prevailing in the borehole with regard to time.

A serious drawback of most of the devices of the above type now on the market is, however, a certain lack of accuracy with regard to the data recorded.

It has been found that in many cases this lack of accuracy is largely caused by the relatively high frictional forces involved in the mechanism of transmission of variations in the volume of the working fluid in accordance with the changes in temperature. These excessively high frictional forces appear to be due to the fact that the transmission members in these devices either remain stationary through relatively large periods of time during temperature-recording operations, whereby a certain amount of sticking is caused, or move at low speeds and over short distances in response to relatively slow changes of temperature within the borehole.

Since it is known (see "High Oiliness—Low Wear" by G. L. Neely, S. A. E. Proceedings, Meeting of May 4–9, 1937) that the friction force opposing the relative motion of two surfaces with regard to each other is always greatest at the moment when such motion begins, and that the coefficient of friction decreases, within a certain range, with increasing speeds, it is clear that the friction opposing the expansion- or contraction-responsive motion of said substantally stationary members serving to transmit variations in the volume of the working fluid, which may be called static friction, is greater than the friction, which may be called dynamic friction, that would obtain if said members were in continuous motion with regard to the supporting elements in contact therewith.

It is, therefore, the object of this invention to provide a borehole temperature recording device for oil wells and the like wherein the transmission elements responsive to the variations in the well temperature are maintained in motion, usually a constant motion, of a predetermined value and direction and independent of the action of the well temperature. The effect of the well temperature is to add another motion component or components to the motion of said elements under conditions where the effect of static friction is eliminated.

It is a further object of this invention to provide a borehole temperature measuring device for oil wells and the like wherein the rotational motion is transmitted to the temperature-responsive element through a resilient member from a rotating spindle which is acted upon by a driving mechanism such as a clockwork. These principles are applied in a co-pending application of Seral No. 184,780, filed January 13, 1938, to a pressure gauge.

Accordingly, the invention provides a temperature-measuring device comprising a plunger or piston movable by variations in volume of the working fluid against the action of a resilient member, and rotatable at the same time by a driving mechanism with regard to the annular elements supporting said plunger or piston, whereby the friction force opposing the temperature-responsive displacement of said piston or plunger is minimized or reduced due to the continuous motion of said plunger with regard to said supporting elements.

The complete temperature-recording device of the present invention comprises a casing which may be subdivided into three portions. The top portion comprises suspension or attachment means whereby the device may be lowered into the borehole at the end of a wire line or tube string. This section may also carry means for taking fluid samples from the well, or for making certain measurements independent of the temperature measurements. The top section being conventional in its design, is not shown in the drawing.

The bottom portion of the temperature-recording device comprises a driving mechanism, such as a spring or a clockwork mechanism, adapted to bring about the rotational motion of the transmission elements responsive to the variations in the well temperature. This mechanism forms no part of this invention and is shown only diagrammatically in the drawing.

The middle portion of the temperature-recording device comprises the essential elements of the present invention and is shown in detail. The construction of an apparatus forming a preferred embodiment of the present invention will be readily understood from the following description taken in reference to the drawing, wherein Fig. 1 is a vertical cross-sectional view of the middle and bottom portion of the device.

Figure 2:
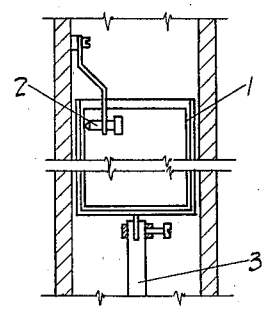

Fig. 2 is a vertical cross-sectional view of one modification of the recording device as shown in Fig. 1.

Referring to the drawing, a chart supported by a chart-carrying member of any suitable form, such, for example, as a fixed drum 1, is shown in contact with suitable motion-registering means, such as a marker, pen, or stylus 2. The marker is affixed to the upper end of a plunger or piston rod 3 which passes through a stuffing box 4 provided with a packing gland 5. The lower end of plunger 3 is connected with a helical pressure spring 6 which is held in engagement between a spring-suspending screw bolt 7 and spring screw nut 8, which may be threadably attached, as shown, to the lower end of the plunger 3.

The lower end of the helical spring 6 is fastened in the same manner to the rotating spindle 9, which passes through stuffing box 10, similar to box 4. The lower end of spindle 9 terminates in a ball bearing 11, adapted to transmit to the spindle 9 the rotational motion of the driving mechanism 25 located in the bottom section of the temperature-recording device without allowing any axial displacement of said spindle.

The helical spring 6 is housed in a chamber 12, filled with a thermally-expansive working fluid, such as, for example, mercury.

To prevent the excessive increase of the friction to which the spindle 9 would be subjected by mercury creeping along this member, the extension 13 of the mercury chamber 12 is shut off at its bottom end by means of packing glands 14, the space 15 therebetween being filled with a suitably chosen auxiliary liquid, such as, for example, oil, glycerine, etc., which acts as a lubricant for the packing glands. A small initial pressure is applied to said liquid by means of spring 16 located in the space 13 and acting on a ring piston 17 and the upper one of the packing glands 14. Whatever pressure may be exerted by the mercury on the ring 17 and the upper gland 14, and so on the auxiliary liquid, owing to the compression of the spring 16, the pressure of the auxiliary liquid will always be higher. In this manner, no leakage of the mercury into the space occupied by the auxiliary liquid can take place.

For a similar purpose only the greater part of the chamber 12 is filled with mercury, the remaining part being filled with the auxiliary liquid, so that in the operating position of the device the packing gland 5 will be in contact with auxiliary liquid only.

To protect the ball bearing 11 from excessive end-thrust, the forces on both ends of the helical spring 6 are balanced by giving the piston rod 3 and the rotating spindle 9 the same diameter.

In operating the device of the present invention the following procedure may be followed.

A screw pump, or any similar device, is connected to the valve and pump connection 18 and auxiliary liquid forced into the space 15 through duct 19 until the spring 16 is completely compressed, which may be at a pressure of, for example, 10 atmospheres, after which the valve and pump connection 18 is closed and the pump disconnected. Any air entrapped in the space 15 may be released by manoeuvring the apparatus to bring the duct 19 in an upward position and slightly opening the valve 18. Then, if necessary, the space is refilled to build up a pressure of, for example, 4 atmospheres therein.

The chamber 12 in the steel casing is filled with mercury up to the lower threads of the stuffing box 4 and the remaining part with the auxiliary liquid, the piston 3 pushed through the said stuffing box and the marker arm attached thereto. Then the valves 20 and 21 in the stuffing box are opened and this member is screwed onto the steel casing, thus forcing the excess of auxiliary liquid and mercury out of the chamber 12 through ducts 22 and 23. After this the piston 3 is pulled out, thus stretching the helical spring 6, at the same time filling in auxiliary liquid through ducts 22 and 23. To prevent entrance of air into the chamber when pulling out the piston, the annular space 24 is also filled with auxiliary liquid. To release any entrapped air the piston is pulled out as far as possible and then pushed in slowly, the air escaping through duct 22 and valve 20.

To make the position of the marker with respect to the chart correspond to the temperature of the mercury, the apparatus is placed in a water bath of known temperature and so much of the auxiliary liquid bled off through duct 22 and valve 20 that the piston carrying the marker acquires the desired position.

After inserting a recording chart and starting the driving mechanism, the apparatus is lowered into the borehole at the end of a wire line or of a string of tubing, and may be stopped for a certain suitable period of time, such, for example, as from 3 to 5 minutes, at any point where a temperature reading is desired.

The temperature of the borehole fluid is transmitted by conductance to the working fluid in chambers 12 and 13, wherein an increase in temperature will cause an increase in the volume of the working fluid, which will cause an axial displacement of the plunger 3 against the action of the spring 6, whereby the marker 2 is moved axially with regard to the chart 1. Since these axial displacements are superimposed on a calibrated rotational displacement continuously imparted to the plunger 3 and the marker 1 by means of the driving mechanism in the bottom section of the device, the spindle 9, and the spring 6, said continuous rotational motion serving to prevent sticking and to minimize the frictional force opposing the axial displacement of plunger 3, while at the same time recording the time element in the graph traced by marker 2, it will be seen that the device of the present invention provides an exceedingly sensitive and reliable device whereby the temperature variations occurring within the borehole may be determined with great accuracy from the record traced by the marker on the chart.

It is understood that the present invention is in no way limited to the specific embodiment described above, but pertains broadly to a temperature-measuring device comprising a thermally-expansive fluid acting against a movable element, wherein said element capable of intermittent temperature-responsive axial motion is also actuated for a continuous motion by means of a temperature-independent mechanism whereby frictional resistance is minimized and the time element is superimposed on the temperature-responsive transmission means to which is attached one of the recording elements. Thus, the same result may be achieved in the embodiment described above by attaching the drum 1 to the end of the plunger 3 while rigidly attaching the marker 2 to the inside wall of the temperature measuring device, as shown in Fig. 2. Further, it is to be understood that the driving means may be of any desired type. Hence, a clockwork or a small electric motor and batteries may be used.

I claim as my invention:

1. A temperature-measuring device for oil wells comprising a casing, a plunger, a driving mechanism, a rotating member actuated by said mechanism, resilient means adapted to transmit the motion of the rotating member to the plunger, temperature-responsive means for displacing said plunger transversely to its plane of rotation, said temperature-responsive means comprising a chamber holding a thermally expansible liquid in contact with the lower face of the plunger, packing glands traversed by said plunger and said rotating member within said chamber, a second liquid in said chamber in contact with said glands, said second liquid being immiscible with the first liquid, and means comprising a marker attached to the plunger in contact with the chart to record thereon the compound displacement resulting from said rotational and said transverse motion of the plunger.

2. A temperature-measuring device for oil wells comprising a casing, a plunger, a driving mechanism, a rotating member actuated by said mechanism, resilient means adapted to transmit the motion of the rotating member to the plunger, temperature-responsive means for displacing said plunger transversely to its plane of rotation, said temperature-responsive means comprising a chamber holding a thermally-expansible liquid in contact with the lower face of the plunger, a packing gland traversed by said plunger within said chamber, a second liquid immiscible with said expansible liquid and in contact with said gland, a pair of packing glands surrounding said rotating member within said chamber, the space between said pair of packing glands being filled with said second liquid, means for maintaining said second liquid in said space at higher pressure than that of said thermally-expansible liquid, said means comprising a ring piston surrounding said rotating member in said chamber and a spring disposed between said ring piston and said pair of glands, and means comprising a marker attached to the plunger in contact with the chart to record thereon the compound displacement resulting from the said rotational and said transverse motions of the plunger.

3. In a temperature-measuring device for oil wells, a casing comprising a chart element and a marker element in contact with said chart element, a plunger carrying one of said elements, a driving mechanism, a rotating member, resilient means adapted to transmit the motion of the rotating member to the plunger, and temperature-responsive means for displacing the plunger transversely to its plane of rotation, said temperature-responsive means comprising a chamber holding a thermally-expansible liquid in contact with the lower face of the plunger, packing glands traversed by said plunger and said rotating member within said chamber, and a second liquid in said chamber in contact with said glands, said second liquid being immiscible with the first liquid, whereby the compound rotational and transverse displacement of the plunger is recorded by the marker element on the chart element.

HELMUT HÜGEL.